(12) United States Patent
Maihoefer

(10) Patent No.: US 10,602,316 B2
(45) Date of Patent: Mar. 24, 2020

(54) METHOD FOR AUTOMATICALLY TRANSMITTING A MESSAGE

(71) Applicant: DAIMLER AG, Stuttgart (DE)

(72) Inventor: Christian Maihoefer, Iggingen (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 15/777,354

(22) PCT Filed: Nov. 15, 2016

(86) PCT No.: PCT/EP2016/001902
§ 371 (c)(1),
(2) Date: May 18, 2018

(87) PCT Pub. No.: WO2017/084750
PCT Pub. Date: Mar. 26, 2017

(65) Prior Publication Data
US 2019/0364401 A1    Nov. 28, 2019

(30) Foreign Application Priority Data

Nov. 20, 2015    (DE) .......... 10 2015 015 050

(51) Int. Cl.
| | | |
|---|---|---|
| H04W 4/40 | (2018.01) | |
| H04W 4/029 | (2018.01) | |
| G08B 21/24 | (2006.01) | |
| H04W 4/02 | (2018.01) | |
| B60R 25/102 | (2013.01) | |
| G07C 5/00 | (2006.01) | |
| H04L 29/08 | (2006.01) | |
| H04W 4/12 | (2009.01) | |

(52) U.S. Cl.
CPC ............ *H04W 4/029* (2018.02); *G08B 21/24* (2013.01); *H04W 4/023* (2013.01); *H04W 4/40* (2018.02); *B60R 25/102* (2013.01); *G07C 5/008* (2013.01); *H04L 67/26* (2013.01); *H04W 4/12* (2013.01)

(58) Field of Classification Search
CPC .......... H04W 4/40; H04W 4/023; G08B 21/24
USPC ........ 455/41.2, 66.1, 575.9; 340/989, 995.16
See application file for complete search history.

(56) References Cited

U.S. PATENT DOCUMENTS 7,187,271 B2    3/2007  Nagata
9,171,268 B1 *  10/2015 Penilla ................. G06Q 10/02
(Continued)

FOREIGN PATENT DOCUMENTS

CN    1661641 A    8/2005
CN    103600720 A    2/2014
(Continued)

OTHER PUBLICATIONS

International Search Report dated Feb. 22, 2017 in related International Application No. PCT/EP2016/001902.
(Continued)

*Primary Examiner* — Congvan Tran
(74) *Attorney, Agent, or Firm* — Patent Portfolio Builders PLLC

(57) ABSTRACT

A method for automatically transmitting a notification about the occurrence of at least one vehicle state of a vehicle to at least one mobile terminal of a user involves performing or preventing the automatic transmission of the notification depending on a geographical area, a predetermined time, a condition predetermined by the user, and/or learned condition.

8 Claims, 1 Drawing Sheet

(56) References Cited

U.S. PATENT DOCUMENTS

| | | |
|---|---|---|
| 9,327,684 B2 | 5/2016 | Kleinstück |
| 9,457,689 B2 | 10/2016 | Stefan et al. |
| 9,522,651 B2 | 12/2016 | Tominaga |
| 9,767,655 B2 | 9/2017 | Yang et al. |
| 2004/0142732 A1* | 7/2004 | Ueda ................ B60R 25/245 455/569.2 |
| 2009/0069977 A1* | 3/2009 | Markyvech .......... G01C 21/36 701/41 |
| 2010/0253491 A1 | 10/2010 | Grossman |
| 2011/0184789 A1* | 7/2011 | Kirsch ............ G06Q 30/0207 705/14.1 |
| 2015/0210287 A1* | 7/2015 | Penilla ................ B60W 40/08 701/49 |
| 2016/0110928 A1* | 4/2016 | Bin Kenaid .......... G01S 19/13 705/13 |
| 2016/0335895 A1* | 11/2016 | Lui ...................... B60R 25/24 |
| 2017/0298659 A1* | 10/2017 | Watanabe ........... E05B 77/465 |

FOREIGN PATENT DOCUMENTS

| | | |
|---|---|---|
| CN | 103856897 A | 6/2014 |
| CN | 103879375 A | 6/2014 |
| CN | 104097606 A | 10/2014 |
| CN | 104464210 A | 3/2015 |
| DE | 102011112540 A1 | 4/2012 |
| DE | 102012022791 A1 | 5/2014 |
| DE | 102014114820 A1 | 4/2015 |
| JP | 2005318335 A | 11/2005 |

OTHER PUBLICATIONS

Written Opinion dated Feb. 22, 2017 in related International Application No. PCT/EP2016/001902.

Office Action dated Nov. 27, 2019 in related/corresponding CN Application No. 201680067250.4 (references from Office Action not cited herewith have previously been made of record).

* cited by examiner

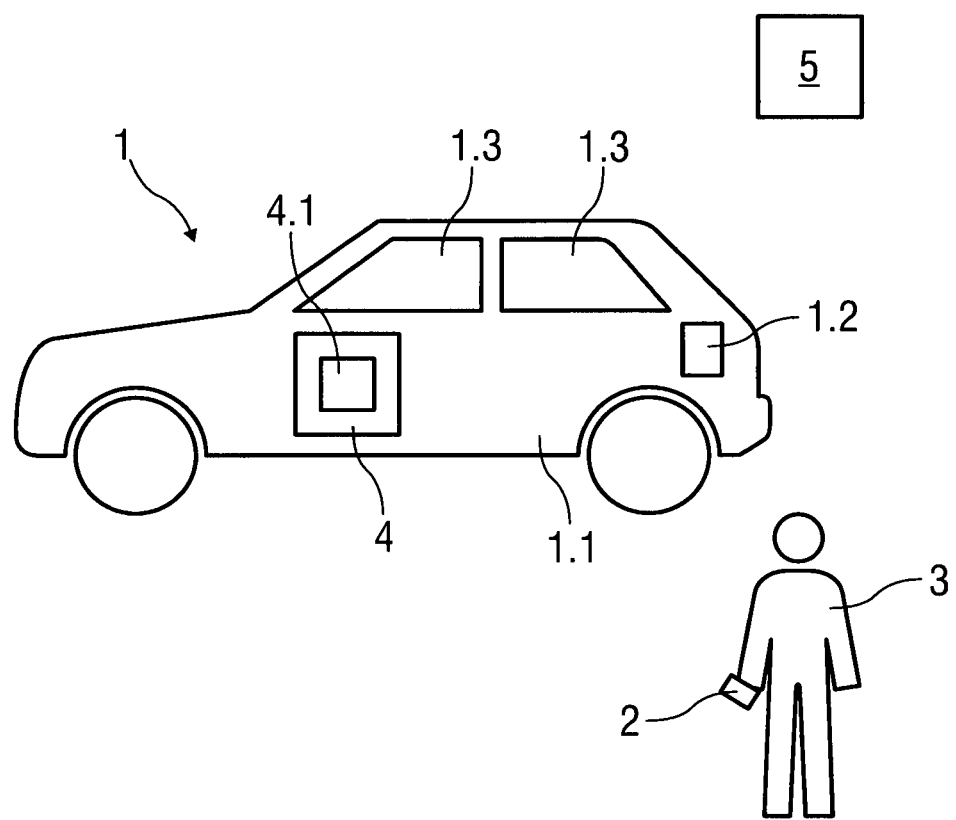

METHOD FOR AUTOMATICALLY TRANSMITTING A MESSAGE

BACKGROUND AND SUMMARY OF THE INVENTION

Exemplary embodiments of the invention relate to a method for automatically transmitting a notification about the occurrence of a vehicle state of a vehicle to at least one mobile terminal.

German patent document DE 10 2011 112 540 A1 discloses a method for the configuration of an automatic transmission of a message about the occurrence of a parameter state of at least one vehicle parameter to at least one communication terminal by means of a user interface connected to a head unit of the vehicle. The method comprises the following steps:

selecting the at least one vehicle parameter and setting the parameter state, at the occurrence of which the message is to be transmitted by means of the user interface, continuous detecting of the vehicle parameter and parameter state by the head unit and checking the at least one continuously detected vehicle parameter and the parameter state by a central computer unit, which is the head unit or an internet server that is communicatively connected to the head unit.

Upon detection by the central computer unit that the set parameter state has occurred, the message is sent from the central computer unit to the communication terminal.

Furthermore, a method, systems and a device for providing a notification for a vehicle that a pre-paired consumer electronic device has been left in the vehicle is known from German patent document DE 10 2014 114 820 A1.

Exemplary embodiments of the invention are directed to a method for automatically transmitting a notification about the occurrence of at least one vehicle state of a vehicle to at least one mobile terminal, said method being improved compared to the prior art.

A method according to the invention for automatically transmitting a notification about the occurrence of at least one vehicle state of a vehicle to at least one mobile terminal of a user provides that the transmission of the notification is carried out or prevented depending on a geographical area, a predetermined time or depending on a condition predetermined by the user and/or learned.

It is possible by means of the method that a user, in particular a driver, of the vehicle is automatically notified when they have forgotten something upon parking or exiting the vehicle, for example that they have forgotten to remove an ignition key from the ignition or forgotten to lock the car doors.

The vehicle thus offers a configuration possibility for the notification, i.e., it can, for example, be configured by the user corresponding to their respective needs and/or be configured in a self-learning manner, in order to, in this manner, avoid notifications that are unnecessary and disturb the user.

BRIEF DESCRIPTION OF THE DRAWING FIGURE

Exemplary embodiments of the invention are illustrated in greater detail below by means of a drawing.

Here are shown:

FIG. 1 schematically, a vehicle and a device for carrying out a method for automatically transmitting a message to at least one mobile terminal.

DETAILED DESCRIPTION

FIG. 1 illustrates a vehicle 1 having a device for carrying out a method for automatically transmitting a message to at least one mobile terminal 2 of a user 3, in particular a driver, of the vehicle 1.

The device comprises the mobile terminal 2, in particular in the form of a smart phone, a communication unit 4.1 arranged in the vehicle 1 as a component of a control unit 4, and a central computer unit 5.

The method provides that the user is notified by means of their mobile terminal 2 when at least one vehicle state of the vehicle 1 occurs.

If the user 3 leaves the vehicle 1, vehicle states are given in such a way that a motor of the vehicle 1 is switched off, an ignition switch is deactivated and an ignition key is removed from the ignition, vehicle doors 1.1, a fuel tank cover 1.2 and a tailgate are closed, vehicle windows 1.3, a hood and/or a sunroof are closed, the vehicle doors 1.1 are locked, in the case of an automatic gearbox, a selector lever is positioned in a parking position, a parking brake is activated, an infotainment system and a vehicle lighting system, in particular an interior lighting system, a dimmed headlight and a parking light are switched off.

These vehicle states are monitored upon an exit of the vehicle 1 or after a predetermined time period, and, if necessary, compared to a predetermined set of rules, in particular target states, wherein in the event of a deviation of one of the monitored vehicle states, a notification is transmitted to the mobile terminal 2 of the user 3 by means of the communication unit 4.1.

An exit of the vehicle 1 is detected using a comparison of a current position of the mobile terminal 1 with a current position of the vehicle 1. A position determination of the mobile end terminal 2 is thus carried out by means of an application program installed on the mobile terminal 2, for example the application program of a so-called Vehicle Homepage.

The detection of the position of the mobile terminal 2 and the vehicle 1 can take place by means of a so-designated local transport communication and by means of the central computer unit.

If a distance between the vehicle 1 and the mobile terminal 2 exceeds a predetermined threshold value, an exit of the vehicle 1 is detected.

Alternatively, or additionally, the exit of the vehicle 1 is detected by the vehicle doors 1.1 being locked, in particular from the outside, for example with a radio remote control.

Again, alternatively or additionally, the exit of the vehicle 1 is detected based on time. For example, the exit of the vehicle is detected by the motor having been switched off for a predetermined time period, for example 10 minutes.

As described above, the vehicle states upon exit of the vehicle 1 or a predetermined time period after the exit of the vehicle 1 are monitored and the user is informed by a notification transmitted to the mobile terminal 2 when, for example:

the ignition key in the vehicle 1 has been forgotten,
the parking brake has not been activated,
the selector lever is not positioned in the parking position,
the fuel tank cover 1.2 is not closed, a vehicle window 1.3 is not closed,
the vehicle doors 1.1 are not locked and/or
the vehicle lighting system is not switched off.

The notification of the user can take place, for example, by an SMS message, i.e., by a message of a short message system, and/or by email. Alternatively, the notification is sent directly to an application program running on the mobile terminal 2. Such a notification is known by the term push notification. Comparatively new desktop browsers allow similar mechanisms.

The user 3 can configure the notifications, whereby the user 3 sets whether they would like to be notified.

For example, it is possible that the detection of the exit of the vehicle 1 is linked to a notification transmitted to the mobile terminal 2 of the user 3 independently of the vehicle states. This notification, which is linked to the detected exit of the vehicle 1, can serve for reminding the user 3 not to leave their handbag in the vehicle 1, for example.

The notification can be configured by the user with respect to geographical areas or time, such that, for example, the notification can be prevented from being transmitted at night when a parking light is switched on or the vehicle doors 1.1 are not locked in the user's garage.

A time or an event can be predetermined by the user 3 as a condition for the transmission of the notification, wherein such a time or such an event is fixedly predetermined as a condition at a configuration time or can be dynamically adjusted by the device. In particular, the predetermination takes place by means of an input to the control unit 4, in particular the communication unit 4.1 and/or the mobile terminal 2 of the user 3.

The device can also be formed in a self-learning manner. If the same notifications occur regularly, at the same places or the same times or under other same environmental conditions, the device suppresses the future transmission of notifications, in particular if the triggering vehicle state is not turned off.

For example, in the case of unlocked vehicle doors 1.1 in the user's garage, the notification of the user 3 caused by these unlocked doors 1.1, and the user 3 does not change this vehicle state despite the notification, this notification will thus no longer be transmitted to the mobile terminal 2 of the user 3 in the future.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, comprising:
   detecting an occurrence of at least one vehicle state of a vehicle;
   determining whether to automatically transmit a notification about the occurrence of at least one vehicle state of a vehicle to at least one mobile terminal of a user depending on a condition predetermined by the user;
   automatically transmitting the notification responsive to the determination to automatically transmit the notification depending on the condition predetermined by the user;
   determining that the at least one vehicle state was not turned off in response to the notification;
   determining another occurrence of the at least one vehicle state; and
   preventing automatic transmission of another notification about the another occurrence of the at least one vehicle state based on the determination that the at least one vehicle state was not turned off in response to the notification.

2. The method of claim 1, wherein the determination of whether to automatically transmit, the automatic transmission further depends on a geographical area or a predetermined time.

3. The method of claim 1, wherein the detection of the occurrence of the at least one vehicle state of the vehicle is performed responsive to the user exiting the vehicle, the method further comprising:
   detecting whether the user exited the vehicle by comparing a current position of the mobile terminal with a current position of the vehicle.

4. The method of claim 1, wherein the detection of the occurrence of the at least one vehicle state of the vehicle is performed responsive to the user exiting the vehicle, the method further comprising:
   detecting whether the user exited the vehicle based on a detection that doors of the vehicle have been locked from outside of the vehicle.

5. The method of claim 1, wherein the condition predetermined by the user includes at least a predetermined time.

6. The method of claim 5, wherein the condition predetermined by the user further includes a geographical area.

7. The method of claim 6, wherein the at least one vehicle state is:
   an ignition key left in the vehicle;
   a parking brake not being activated,
   a selector lever not being positioned in a parking position;
   a fuel tank cover not being closed;
   a vehicle window not being closed;
   a vehicle door not being locked; or
   a vehicle lighting system not being switched off.

8. The method of claim 1, wherein the notification is transmitted using SMS.

* * * * *